United States Patent [19]

Mason

[11] 3,957,206
[45] May 18, 1976

[54] EXTENDABLE ROCKET MOTOR EXHAUST NOZZLE

[75] Inventor: Jerry N. Mason, Redlands, Calif.

[73] Assignee: The United States of America as represented by the Secretary of the Air Force, Washington, D.C.

[22] Filed: Jan. 27, 1975

[21] Appl. No.: 544,456

[52] U.S. Cl. .............................. 239/265.33; 60/242; 60/271
[51] Int. Cl.² ........................ F02K 1/24; F02K 9/00
[58] Field of Search ............ 60/271, 230, 232, 242; 239/265.19, 265.43, 265.33; 75/170; 244/1 R, 158

[56] References Cited
UNITED STATES PATENTS

| | | | |
|---|---|---|---|
| 3,450,372 | 6/1969 | De Lange et al. | 244/158 |
| 3,482,783 | 12/1969 | Nebiker et al. | 60/271 X |
| 3,596,465 | 8/1971 | Paine | 60/271 |
| 3,711,027 | 1/1973 | Carey | 60/271 X |
| 3,784,109 | 1/1974 | Dueringer | 239/265.43 |

OTHER PUBLICATIONS

Iron Age, Oct. 5, 1972, p. 86.
Rubber World, Feb. 1973, p. 56.

*Primary Examiner*—Carlton R. Croyle
*Assistant Examiner*—Robert E. Garrett
*Attorney, Agent, or Firm*—Joseph E. Rusz; William J. O'Brien

[57] ABSTRACT

An extendable exhaust nozzle for rocket motors that can be deployed from a stored compact position to an extended position. The interior surface of the nozzle is provided with a thin layer of a nickel-titanium alloy that is characterized by its ability to revert back to its original shape, subsequent to being deformed. The alloy is applied to the nozzle surfaces while in extended form, and then the nozzle is folded and stored. It can then be deployed to its extended shape at any time by heating the nozzle.

2 Claims, 2 Drawing Figures

EXTENDABLE ROCKET MOTOR EXHAUST NOZZLE

STATEMENT OF GOVERNMENT INTEREST

The invention described herein may be manufactured and used by or for the Government for governmental purposes without the payment of any royalty thereon.

BACKGROUND OF THE INVENTION

This invention relates to an extendable exhaust nozzle for rocket motors. In a more particular aspect, this invention concerns itself with a system for deploying an extendable rocket motor exhaust nozzle or exit cone.

With the present interest in the operation of space vehicles, considerable research has been conducted in an attempt to increase the overall efficiency of rocket engines. One area of particular interest is the rocket engines' nozzle or exit cone. It is well known that an increase in the area ratio of the engine nozzle throat to the area of the engine nozzle exit cone will increase the performance of a rocket engine since it allows the exhaust gases to drop as close as possible to the ambient pressure outside the rocket. When a rocket is fired in the earth's atmosphere, particularly near sea level, the rocket nozzle does not have to be very large because the pressure drop to ambient pressure occurs very rapidly and efficiently in a short nozzle. However, when a rocket begins to operate in the upper atmosphere, the pressure drop to the ambient pressure surrounding the rocket becomes much more difficult and therefore the nozzle must become much larger in size in order to be efficient.

In order to solve this problem, several methods of expanding or extending the nozzle have been suggested. However, if the existing nozzle structure of an engine is simply extended to produce a larger area ratio, the extension in some instances would interfere with components, such as propellant tanks, of the adjoining stage of the space vehicle. Thus, what is required is a nozzle that can be stored in a compact or non-extended condition and then deployed to its extended condition at a predetermined time to increase the operational efficiency of the rocket engine.

With the present invention, it has been found that rocket engine exit cones of the extendable type can be stored and then extended by a system which provides for coating, plating or bonding a particular nickel-base alloy, referred to as Nitinol, to the interior surfaces of the engine's exit cone. This particular alloy exhibits the unusual property of "mechanical memory" and it is this property that provides the unique means for deploying the exit cone to its extended position. The invention provides a novel means for deploying extendable rocket nozzles or exit cones and entirely eliminates the complex and expensive mechanical deployment schemes utilized heretofore.

SUMMARY OF THE INVENTION

In accordance with this invention, it has been found that rocket engine nozzles or exit cones of the extendable type can be deployed to their extended position by a system which includes the application of a particular type nickel base alloy to the interior surfaces of the nozzle or exit cone. The alloy material is applied by the conventional techniques of coating, bonding or plating while the exit cone is in its extended position. It is then stored in its compact position until ready for deployment. The particular alloy applied to the inner surface of the exit cone is known as Nitinol. It is a nickel-titanium alloy and exhibits the unusual property of mechanical memory which is a function of deformation and temperature. Whenever the alloy is subjected to heat it reverts to its original shape. This invention takes advantage of this particular trait of Nitinol as a deployment system for extendable exit cones. After the Nitinol is applied to the inside layer of the exit cone in its extended position, the cone is stored in a deformed position. When time comes to deploy the exit cone, heat is applied raising Nitinol to its transition temperature. The Nitinol "remembers" its uncollapsed position and deploys the exit cone as it returns to its original extended shape. The heat input necessary to raise Nitinol to its transition temperature may come from the rocket motor ignition or, depending upon the rocket staging sequence or other operational features, the heat may be provided by electrical resistance heating or hot gases from a gas generator.

Accordingly, the primary object of this invention is to provide an improved extendable exhaust nozzle structure for a rocket motor.

Another object of this invention is to provide a new and improved system for deploying an extendable nozzle from its compact stored position to its extended utilitarian position.

Still another object of this invention is to utilize the unique characteristic of mechanical memory exhibited by a particular type nickel alloy as a deployment system for rocket engine exit cones of the extendable type.

A further object of this invention is to provide a rocket motor exhaust nozzle that can be stored in a compacted position and then deployed to its extended position upon the application of heat.

The above and still further objects and advantages of the present invention will become more readily apparent upon consideration of the following detailed description of specific embodiments thereof when taken in conjunction with the accompanying drawings.

DESCRIPTION OF THE PREFERRED EMBODIMENT

The extendable rocket motor exhaust nozzle of this invention comprises a frusto-cone shaped member fabricated from a thin sheet of ductile, light weight metal to form a nozzle wall structure adapted to be deployed in an extended manner. The structure is adapted to be attached in a conventional manner to a rocket engine. It may also assume any of the conventional nozzle configurations other than the frusto-conical shape referred to above.

The interior surface of the nozzle structure is coated, bonded or plated with a particular type of metal alloy called Nitinol. Nitinol is a single phase durable alloy composed of nickel and titanium. It exhibits the unusual characteristic of mechanical memory. That is, if the alloy is heated to its transition temperature, it reverts back to its original shape. This ability to revert back to its original shape forms the basis for the deployment system of this invention.

The alloy is applied to the interior surfaces of the nozzle structure in its fully extended position. After application of the alloy, the nozzle is stored in a compacted or folded position. At a predetermined time, the folded nozzle is deployed to its extended position by heating the nozzle to the transition temperature of the Nitinol alloy. The Nitinol remembers its uncollapsed position and returns to its extended position. The heat necessary to reach the transition temperature may be supplied from the rocket motor ignition or from an auxillary source such as an electrical resistance heater or from the hot gases of a gas generator.

The mechanical memory characteristic of Nitinol provides the necessary force to deploy the extendable rocket motor cone of this invention. This concept provides a novel means for deploying extendable cones and eliminates the complicated mechanical linkage and joints relied on heretofore. In addition, since the melting point of Nitinol is much lower than the temperature of the rocket motor exhaust gases, the Nitinol will melt and exit the exhaust nozzle with the normal rocket exhaust gases. The primary advantage of this melting is that there is no weight penalty to the motor stage for the deployment scheme which normally must be carried throughout the stage operation or jettisoned after the exit cone deployment. A secondary advantage is that a small increase in performance should occur because of the mass of the Nitinol alloy exiting the nozzle.

In the application of the deployment scheme of this invention to a specific nozzle structure, any well known design configuration may be employed. As previously noted, the construction only requires a thin, light weight, ductile metal sheet suitably shaped to form a nozzle structure and having a coating or plating of Nitinol alloy applied to the interior surfaces of the nozzle structure.

Figure 1:
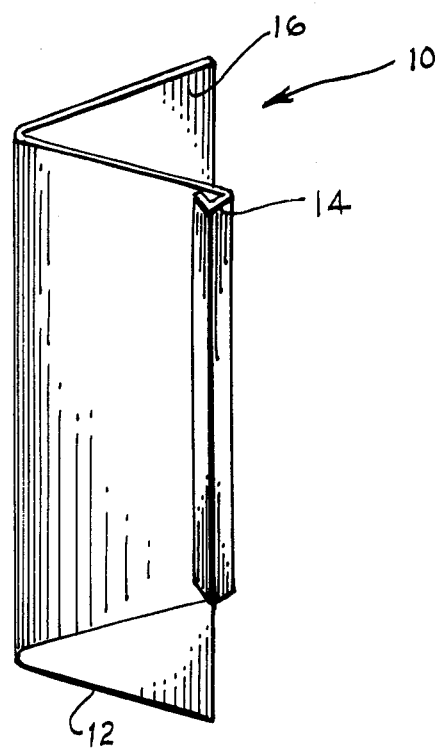
FIG. 1 represents a schematic illustration of the extendable rocket engine exit cone of this invention in its compact stored position.
Figure 2:
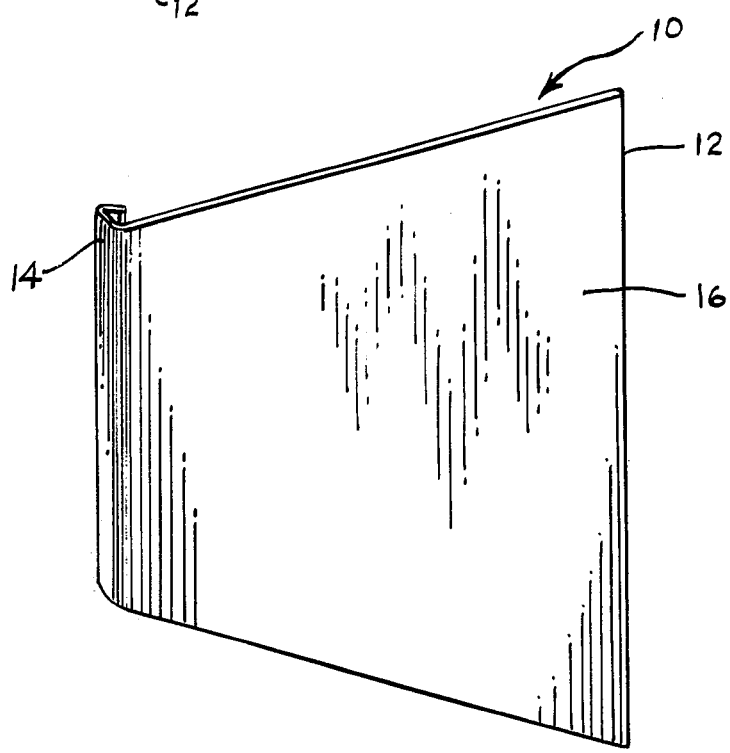
FIG. 2 represents a schematic illustration of the exit cone of FIG. 1 deployed to its extended position.

For the purpose of illustrating a typical construction of the extendable nozzle of this invention, reference is made to the accompanying drawing. In the drawing, there is shown in FIG. 1, a frusto-conical shaped nozzle structure 10 in its stored or compacted position, and which is fabricated from a thin, lightweight, ductile and heat resistant metal 12. Columbium metal, such as Columbium C-103, has proven to be a suitable material for the nozzle structure. At the smaller end, the nozzle is dimensioned so as to be permanently attached by means of flange 14 to the exit orifice of a conventional rocket motor, not shown. The Nitinol alloy 16 is applied to the interior surface of the nozzle structure in its extended position as shown in FIG. 2.

The Nitinol may be applied by fusion welding, spot welding or brazing. The joining of this alloy requires the same care and techniques applied to other titanium based alloys. For the particular application contemplated by this invention, however, adhesive bonding has been found to be the most practicable form of joining the Nitinol to the metal exit cone. As stated heretofore, the Nitinol is applied to the exit cone in its extended or deployed position as shown in FIG. 2 and then rolled back on itself, as shown in FIG. 1, and then stored until ready for use.

The specific technique used would depend upon the particular metal used for the exit cone. The Nitinol can be prepared for the bonding by cleaning with a solution of 10 parts (by weight) sodium fluoride, five parts chromium trioxide, 250 parts distilled water, and 50 parts concentrated $H_2SO_4$ (specific gravity 1.86). The exit cone is positioned with the small end down and the liquid, unmodified epoxy adhesive is applied by brush to both the exit cone and the Nitinol in accordance with the design. The Nitinol is placed in the proper position. Only the contact pressure is required and the system is left until cured at ambient temperature.

The Nitinol may be purchased in flat sheets of the proper thickness (about 0.120 inches for the design configuration of Examples 1 and 2, and cut to the proper shape. The Nitinol is formed into a cone. This Nitinol cone is then annealed at a temperature between 750°–1100°F for 5–10 minutes. The specific annealing temperature and duration may vary depending upon the specific application. Following the annealing process, the oxide must be removed. This can be accomplished by immersion in a solution of two parts water, one part concentrated nitric acid and ⅛ part hydrofluoric acid (48 percent) heated to 185°F. After the oxide is removed, the Nitinol should be washed in water.

Following the annealing and oxide removal processes, the Nitinol cone is deformed into its final shape. After checking the deformed shape for fit with the undeployed exit cone, both the metal exit cone and the Nitinol are prepared for bonding. The metal exit cone is cleaned and prepared for bonding by any one of several industrial techniques. Nitinol is a Nickel-Titanium alloy developed at the U.S. Naval Ordnance Laboratory containing 54–56 weight percent nickel-balance titanium and possessing an interesting combination of properties. It exhibits a unique mechanical memory effect, is non-magnetic, is corrosion resistant, and possesses a relatively low density of 0.234 lb. per cu. in. Because of this mechanical memory and under proper conditions, Nitinol objects can be restored to their original shape and dimensions after being plastically deformed out of shape by annealing at 950° to 1100°F. This return to the original configuration is achieved by merely heating the alloy to a moderate temperature above its transition temperature.

The shape recovery phenomenon is the result of a transition in crystal structure that occurs by deformation and cooling. Upon reversing the transition by heating, the structure reverts to its higher temperature form. Since the transition on heating or cooling begins and ends at different temperatures, it is common to speak of "transition temperature range" or TTR. The transition temperature can then be defined as the temperature at which the transition ends on heating; i.e., the upper temperature limit of the TTR. The specific transition temperature (and TTR) depends primarily on the chemical composition of the alloy as well as on the processing history. By varying the nickel content (or substituting cobalt for part of the nickel), transition temperatures can be obtained from well below room temperature to as high as 275°F.

A simple method of measuring the TTR is to bend an annealed sample around a mandrel of a diameter 10 times the sample thickness at a temperature below the TTR. The sample can then be inserted in different temperature baths to pinpoint the beginning and the ending of the recovery to the original shape.

When strained Nitinol is heated through its TTR, not only does it return to its original shape, but it exerts considerable force.

The configuration of Nitinol that is to be remembered must be set in the material by restraining it in the desired shape while annealing at 950°–1100°F for relatively short times (minutes). Once this shape has been annealed in, the object can be plastically deformed below its TTR and upon heating through the TTR, the original shape will be restored. This cycle of deformation and recovery can be repeated a great many times as long as the plastic deformation is induced below the TTR, and limited to no more than about 8 percent. Higher levels of deformation result in only partial recovery. Annealling at temperatures higher or lower than optimum results in only partial restoration of the original shape. If the material is plastically deformed at a temperature above the TTR (but below the annealing temperature) this will change the memory shape configuration. However, return to the original shape can be approximated by restraining the material to the desired configuration and re-annealing.

While the principles of this invention have been discussed with particularity, it should be understood that various modifications and alterations can be made without departing from the spirit of the invention, the scope of which is defined by the appended claims.

What is claimed is:

1. In an extendable exhaust nozzle for a rocket engine comprising a thin, ductile, heat resistant sheet metal member suitably configured to form a deformable nozzle structure having interior and exterior surfaces with one end thereof having a smaller portion, and adapted to be permanently affixed to the exit port of a rocket motor, the improvement which comprises a deformable, metal alloy coating on said interior surface of said deformable nozzle structure, said metal alloy having a compositional content consisting essentially of about 54 to 56 percent by weight nickel with the balance substantially all titanium and being characterized by its ability to revert to its original shape subsequent to being deformed.

2. A rocket nozzle in accordance with claim 1 wherein said nozzle structure configuration is frusto-conical.

* * * * *